Sept. 11, 1962     C. F. LOVEN     3,052,969
AUTOMATIC ASSEMBLY APPARATUS

Filed Oct. 8, 1959     3 Sheets-Sheet 1

*INVENTOR.*
CARL FREDRIK LOVEN
BY George H. Montemayor
ATTY.

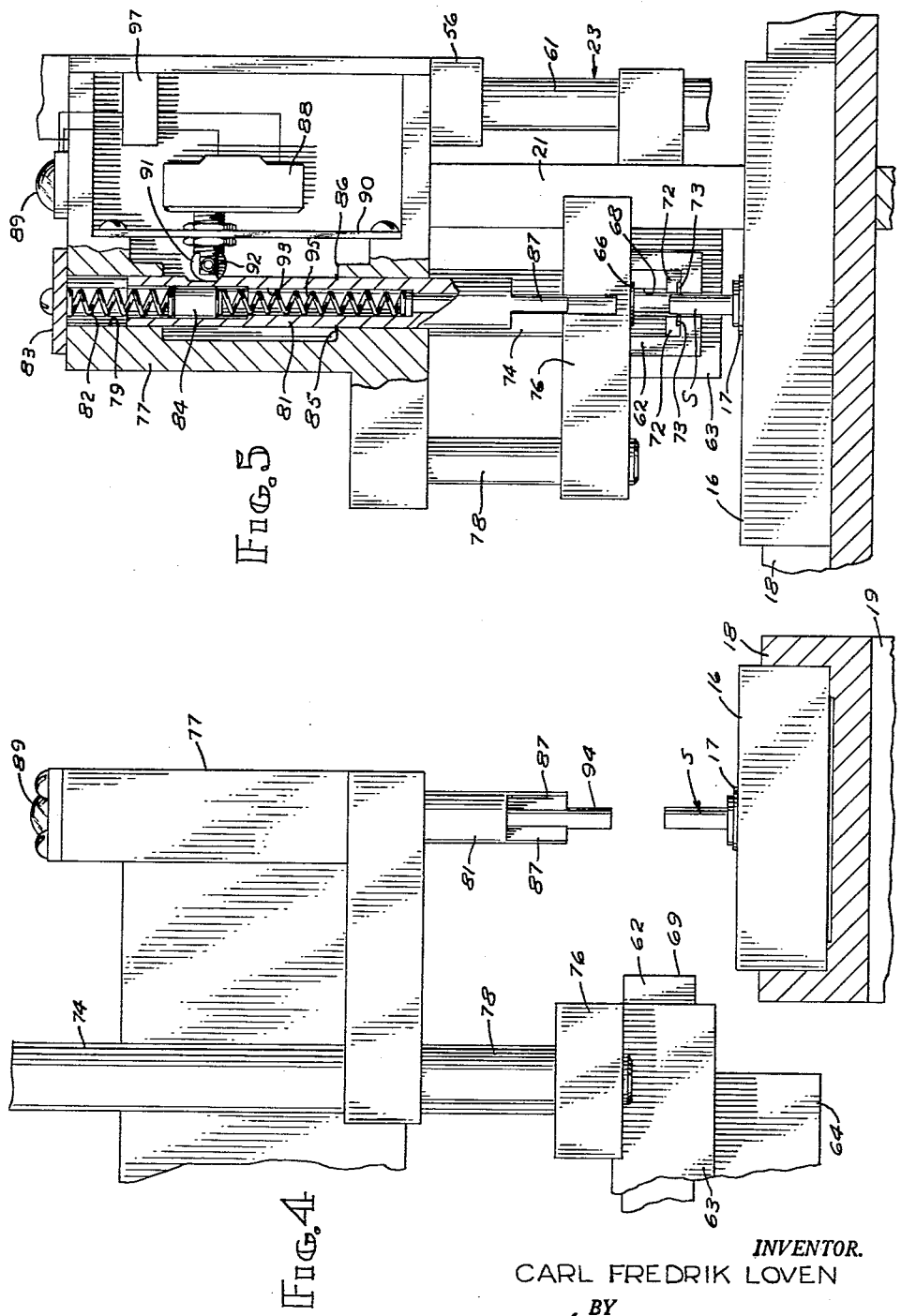

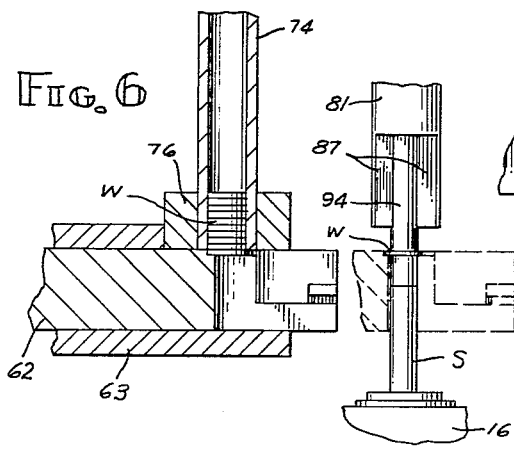
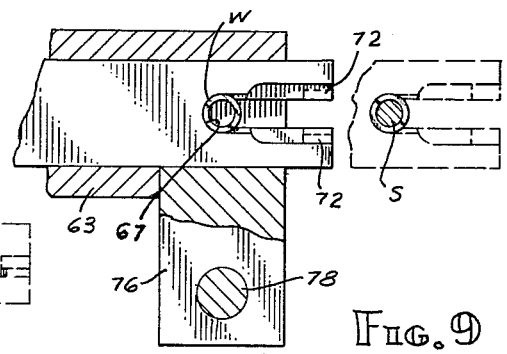
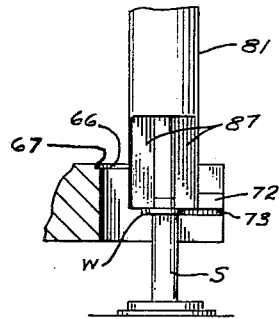
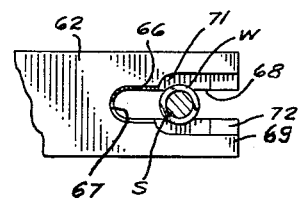
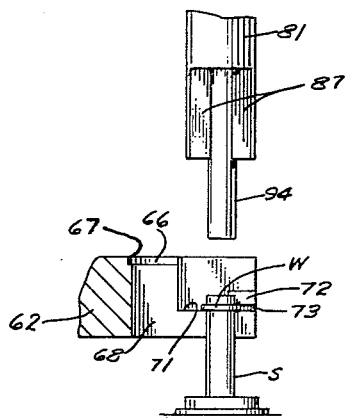
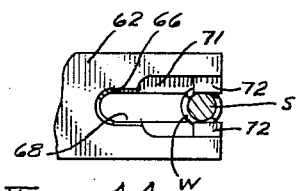

United States Patent Office 3,052,969
Patented Sept. 11, 1962

3,052,969
AUTOMATIC ASSEMBLY APPARATUS
Carl Fredrik Loven, Janesville, Wis., assignor to The Parker Pen Company, Janesville, Wis., a corporation of Wisconsin
Filed Oct. 8, 1959, Ser. No. 845,122
13 Claims. (Cl. 29—211)

This invention relates to an apparatus for loading an apertured member onto a stud, and, more particularly, to an apparatus for guiding and moving an apertured member onto a stud and for holding it on the latter while the guiding and moving means are withdrawn from association with the apertured member. The apertured member may be any annular or substantially annular member, such as a split or continuous washer, nut, spring or the like, that is to be received on a stud, such as a pin, bolt, rod or the like, whether threaded or not.

One of the principal aspects of automatic, or automated, machine assembly of elements of modern manufacture is the positive handling of those elements, with a minimum of operations during which those elements are not completely and positively controlled. The more positive and continuous the control of the elements to be assembled, the greater the efficiency and reliability of the machine. This need for positive control is extremely great for certain elements that are normally difficult to handle, such as small thin washers on the order of .008 to .010 inch in thickness, which do not fall in predictable manner, and which tend to adhere to elements with which they come in contact. This same need is also great when it is necessary to handle an apertured member in a direction other than vertically downward.

It is an object of the present invention to provide a novel apparatus for automatically loading an apertured member onto a stud, whereby a positive control is maintained over the member until it is positioned on the stud.

A further object is to provide an apparatus for loading an apertured member onto a stud and retaining it on the stud while the applying element of the apparatus is retracted.

Yet a further object is to provide an apparatus for loading an apertured member onto a stud, that moves the member into a predetermined position, entraps the member on a guiding element from which it cannot escape from being moved onto the stud, pushing the member positively onto the stud, and holding the member on the stud while the pushing element is retracting.

Another object is to provide an apparatus for loading an apertured member onto a stud, wherein the pushing element novelly performs a check for the presence of the member in loaded position on the stud.

Other objects and advantages of the invention will be apparent from the following description of a preferred embodiment of the invention, taken in conjunction with the appended drawings, in which:

FIG. 4 is a fragmentary side elevational view, on an enlarged scale, of the structure of FIG. 1;

FIG. 5 is a fragmentary front elevational view of the structure of FIG. 4, broken away in part to reveal interior details;

FIGS. 6 through 8 are fragmentary side elevational views, partly in section, of the apparatus, illustrating the movements and sequence of operations of the elements of the apparatus; and FIGS. 9 through 11 are fragmentary top plan views, partly in section, of the apparatus shown in FIGS. 6 through 8.

Figure 1:
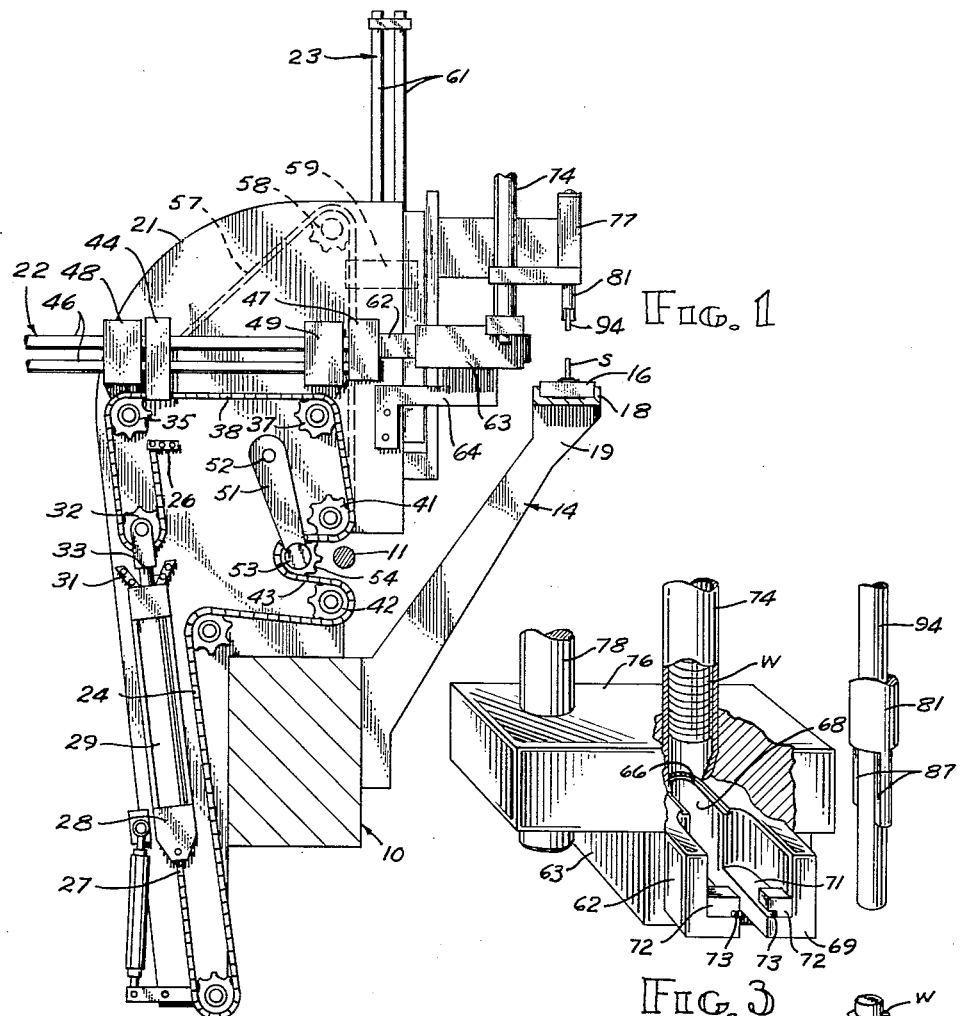
FIGURE 1 is a side elevational view of the present apparatus, embodied in a work station mounted on the base of an assembly machine that is shown in a fragmentary sectional view.
Figure 3:
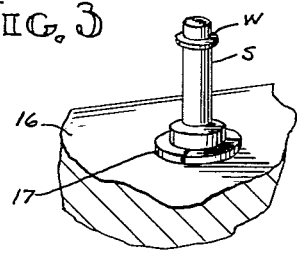
FIG. 3 is a fragmentary perspective view of the loading apparatus in spaced association with a stud on which an apertured member or washer has been loaded.

Referring now to the drawings, and particularly to FIGURE 1 thereof, the illustrative apparatus is shown embodied in a work station of an assembly machine that includes a mounting bed or base 10, a cam shaft 11 for transmitting the force of a power means (not shown), cams 12 and 13 fastened onto the cam shaft, and a structure 14 that supports a stud S in a predetermined upstanding position for having an apertured member, such as the washer W, loaded thereon. The supporting structure 14 preferably includes a fixture 16 that has a collet 17 for gripping the stud S, a receptacle or track 18 for the fixture 16, and an arm 19 that supports the track 16 on the base 10.

The operating mechanism of the apparatus is suitably supported on the base 10 by means of a mounting plate 21 that carries a horizontal reciprocating drive device 22 and a vertical drive device 23 on opposite sides thereof. In the present embodiment, the drive devices are generally similar to that disclosed in an application for United States patent filed October 13, 1958, in the name of John Philippi, under Serial No. 766,989, now United States Patent No. 2,936,639 issued May 17, 1960.

The horizontal drive device 22 includes a non-elastic flexible chain 24 fixed at one end 26 to the mounting plate 21, and at the other end 27 to the end 28 of a movable hydraulic cylinder 29 that normally abuts a stop 31 fixed to the mounting plate 21. The chain 24 is supported on a pulley sprocket 32 mounted on one end of the piston rod 33 of the hydraulic cylinder, so that a pulling force of the chain that acts on both ends thereof will be twice as large on the piston rod 33 as on the hydraulic cylinder 29. The chain 24 rides on supporting sprockets 35 and 37, which provide a straight-line path of horizontal reciprocation for a portion 38 of the chain 24, and on supporting sprockets 41 and 42, which define between them a force-receiving portion 43 of the chain 24. A connector block 44 is fastened to the chain portion 38 that moves in horizontal reciprocation, and the connector block is, in turn, connected in driving relation to a pair of reciprocable slide rods 46 that drive a tool mounting head 47, and that are journaled in slide blocks 48 and 49 that are mounted on the mounting plate 21. The force-applying structure of the drive device comprises an arm 51, having a pivotal connection 52 at one end with the mounting plate 21, and having at the other end a cam roller 53 and an arm sprocket 54 for the chain. The cam roller is positioned to be engaged and pushed by the cam 12 as the latter rotates with the rotating cam shaft 11, to pivotally reciprocate the arm 51 and to cause the arm sprocket 54 to push against the chain portion 43. In the absence of any obstruction of movement of the chain 24 or the elements connected to it, rotation of the cam 12 will effect a horizontal reciprocation of the chain portion 38, the connector block 44, the slide rods 46, and the tool head 47 as the piston rod 33 is pulled out of and retracted back into the hydraulic cylinder. Upon any obstruction of the movement of the chain portion 38, the pivoting of the arm 51 will result in the movement of the hydraulic cylinder 29 away from its stop 31, in an overload relief or jam relief action.

The vertical reciprocating drive device 23 is similar to the horizontal drive device 22, and is conveniently mounted on the side of the mounting plate 21 opposite to the side on which the horizontal drive device is mounted. The vertical drive device is adapted for a vertical reciprocation of a tool mounting frame 56, and includes a chain 57, a supporting sprocket 58 and other guiding sprockets (not shown) mounted on the mounting plate 21, and a mounting block 59 connected to the chain 57 and to a pair of reciprocable slide bars 61 to which the tool mounting frame 56 is connected. The cam 13 is fastened to the cam shaft 11 adjacent the cam 12, and is configured to drivingly engage a pivotable arm (not shown) corresponding to the arm 51 of the horizontal drive device and adapted to reciprocate the chain 57.

The tool mounting head 47 of the horizontal drive device is drivingly connected to a shuttle 62 that is slidably supported within a guide frame 63 that is suitably mounted on the mounting plate 21 by means of a bracket 64. The shuttle 62 is reciprocable by the horizontal drive device toward and away from the stud S.

A shallow pocket 66 having a rearmost shoulder 67 is provided in the top of the shuttle 62 spaced back from the front end thereof. The pocket 66 opens forwardly, and is configured to receive a single annular member, or washer W, therein, and to push the same forwardly upon forward movement of the shuttle. In the present embodiment, the annular member being loaded is a washer W on the order of .008 to .010 inch in thickness, and the pocket 66 is of a depth of about .006 inch.

The front end of the shuttle 62 is split vertically by a vertical slot 68 that extends through the front face 69 of the shuttle, back through the pocket 66, and that is slightly wider than the diameter of the stud S.

Intermediate the pocket 66 and the front face 69 of the shuttle, the shuttle top is recessed to provide a flat intermediate surface 71 that is lower than the pocket 66, although at a level above the bottom of the shuttle, and that is split by the vertical slot 68. A pair of spaced blocks 72 are provided on the front of the shuttle, fixed thereto or integral therewith, in complementary relationship on opposite sides of the vertical slot 68. These blocks 72 are each cut away complementally to form in each a horizontal longitudinal groove 73 that has a bottom surface co-extensive with the intermediate surface 71. These grooves 73 are dimensioned and positioned to permit a washer W to pass therethrough.

The shuttle 62 is so aligned relative to the stud S, that the shuttle reciprocates toward and away from the stud S to receive the latter within the vertical slot 68. The vertical alignment of the shuttle and the stud S is such that the top of the stud S is higher than the level of the intermediate shuttle surface 71, but lower than the level of the shuttle pocket.

A supply of washers W is fed by gravity to the shuttle in stacked relationship through an upstanding feed tube 74 that is connected to an escapement block 76 fastened to the shuttle guide frame 63.

A box-like housing 77 is mounted on the tool mounting frame 56 of the vertical drive device 23 for vertical reciprocation therewith. Suitably, the reciprocation of the housing 77 is guided by a slide rod 78 connected to the housing, and slidably received in a slide bearing in the fixed escapement block 76.

The housing 77 is provided with a vertical bore 79 that slidably accommodates a tubular sleeve 81 so that the latter projects down from the housing. The sleeve 81 is resiliently urged downwardly by a helical spring 82 that bears against a housing cover plate 83 and against a plug 84 that is adjustably connected to the sleeve. Means are provided for retaining the sleeve against falling from the housing, and suitably take the form of a retaining ring 85 that is fastened to the sleeve so as to abut a shoulder 86 in the housing.

A pair of diametrically opposed pusher elements or fingers 87 extend longitudinally from the sleeve 81. These pusher fingers are of a width adapted to be received in, and are in alignment with, the vertical slot 68 of the shuttle 62.

A switch 88 for a checking circuit, such as a circuit that includes an indicating light 89 or an electrical relay, electrically connected to a current source (not shown) through a terminal box 97, is mounted on a plate 90 within the housing and has a roller button 91 by which the switch is actuated. The switch is actuated to open and close the checking circuit, as the roller button 91 rides laterally into or is cammed out of a recess 92 in the sleeve 81 whenever the sleeve is reciprocated relative to the housing and the roller button, such as when the housing is being lowered and the pusher fingers 87 of the sleeve have butted against a fixed object such as a washer W that halts the sleeve and causes it to be pushed into the housing against the resilient force of the spring 82.

The sleeve 81 has a bore 93 wherein an elongate guide pin 94 is slidably carried that is of the same diameter as the stud S, and that is so mounted with the sleeve, that the sleeve and the guide pin are in axial alignment with the predetermined supported position for the stud S. The guide pin is resiliently urged downwardly by a helical spring 95, is provided with a head 96 that bottoms against a shoulder within the sleeve to prevent the pin from falling down from the sleeve, and is of a length such that its lower end normally projects below the lower end of each of the pusher fingers 87.

Figure 2:
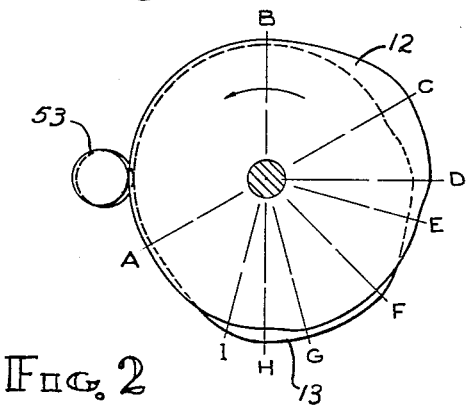
FIG. 2 is a view of the cams of FIG. 1, on an enlarged scale.

Referring now to FIG. 2, the shuttle cam 12 is configured with arcuate dwell portions of varying cam radii, and with corresponding cam rises and cam falls therebetween, so that: through an arcuate cam dwell AB the shuttle 62 is in a fully retracted position where the shuttle pocket 66 is axially aligned with the feed tube 74 so that a washer W will drop into the pocket; during a cam rise BC the shuttle is moved to a fully projected position where the shuttle pocket 66 is axially aligned under the guide pin 94; through a cam dwell CD the shuttle is held in fully projected position; during a cam fall DE the shuttle is moved to a first partially retracted position where the intermediate surface portion 71 of the shuttle is aligned under the guide pin 94; through a cam dwell EG the shuttle is held in the first partially retracted position; during a cam fall GH the shuttle is moved to a second partially retracted position where the horizontal grooves 73 of the shuttle are aligned with the guide pin; through a cam dwell HI the shuttle is held in the second partially retracted position; and during a cam fall IA the shuttle is moved to fully retracted position.

The housing cam 13 is configured with arcuate dwell portions of varying cam radii, and with corresponding cam rises and cam falls therebetween, so that: through an arcuate cam dwell AC the housing 77 and the guide pin 94 and pusher fingers 87 that are connected thereto are in a fully raised or retracted position where the bottom of the guide pin 94 is above the level of the shuttle pocket 66; during a cam rise CD the housing is moved to a partially lowered position where the guide pin 94 has passed through the level of the pocket and axially abuts the stud S; through a cam dwell DE the housing is held in paritally lowered position; during a cam rise EF the housing is moved to a fully lowered position where the pusher fingers 87 press a washer W against the intermediate shuttle portion 71 if any washer W is positioned on the guide pin 94, or where, if a washer W is not present, the pusher fingers 87 pass through the vertical slot 68 of the shuttle 62 so that the bottoms of the pusher fingers 87 are below the level of the intermediate shuttle surface portion 71; through a cam dwell FH the housing is held in fully lowered position; and during a cam fall HA the housing is moved to fully raised position.

The cams 12 and 13 are mounted on the cam shaft 11 so that the following sequence of movements is effected: the housing 77 is in fully raised or retracted position while the shuttle 62 is in fully retracted position for receiving a washer W in the pocket 66; the shuttle 62 is moved fully forward to axially align the washer W under the guide pin 94; the housing 77 lowers to move the guide pin 94 down through the washer W that is in the shuttle pocket, and into axial abutment with the stud S; the shuttle 62 retracts partially to a position where the intermediate shuttle surface portion 71 is aligned under the guide pin 94, during which movement the washer W is held by the guide pin and is pulled out of the pocket 66; the housing 77 moves to fully lowered position during which the pusher fingers 87 push the washer W down off the guide pin 94, onto the stud S, and against the intermediate shuttle surface portion 71, the sleeve 81 being resiliently pushed up into the lowering housing by the washer W that is pressed down on the intermediate shuttle surface portion 71; the shuttle 62 retracts further to a second intermediate position where the horizontal grooves 73 are retaining the edges of the washer W and holding the washer W against vertical movement; the housing 77 raises to fully retracted position, pulling the pusher fingers 87 up from the washer W that is trapped and held on the stud S; and the shuttle 62 retracts to fully retracted position, leaving the washer W on the stud S.

It will be seen that if a washer W should not have been trapped on the guiding pin 94, and subsequently pushed down onto the stud S and onto the intermediate shuttle surface portion 71, the pusher fingers 87 will move down through the vertical slot 68 and past the intermediate surface 71 as the housing 77 is lowered, with the result that the downward movement of the sleeve 81 will not be prevented by the washer W, and the switch 88 will not be actuated, to show a missing washer W.

When a washer W is duly pushed down onto the stud S and against the intermediate shuttle surface portion 71, further downward movement of the sleeve 81 will be prevented, and the continued downward movement of the housing 77 will move the roller button 91 out of the sleeve recess 92 to actuate the switch 88 and show the proper presence of a washer W. On this point, it is to be noted that the check for the presence of a washer W on the stud S is novelly and effectively made by supporting the washer W on the stud S but above the head thereof, so that the washer W is used as a stop member that prevents a substantial, i.e. one-eighth inch or more, further movement of the pusher fingers 87 down through the vertical slot 68. The presence-check is not, therefore, the extremely small and difficult measurement of whether a checking probe does or does not abut a washer W of a thickness of .008 inch before the probe abuts the head of the stud S. By holding the washer W away from the stud head, the "presence" of a washer is easily and novelly checked, rather than the "thickness" of a washer.

The structure described above is a new and useful apparatus for positively loading a washer W onto a stud S, and for holding that washer W on the stud S so that it is not pulled off the stud S by adhering to the loading elements. The principles of this invention may be applied to the loading of an apertured member on a stud that is not in upstanding position upon the addition of means for finally associating the apertured member and stud together, such as when the stud is threaded and the apertured member is a nut that can be run onto the stud.

It will be apparent to those skilled in the art to which this invention pertains, that various changes and modifications may be made herein, without departing from the spirit of the invention or from the scope of the appended claims.

I claim:

1. Apparatus for loading apertured members onto a stud, comprising, means for supporting the stud; reciprocating feed means for moving an apertured member from a supply means into axial alignment with the stud; a guide pin aligned axially with the stud and reciprocable theretoward in timed relationship with said feed means through the apertured member aligned with said stud and into abutment with said stud when the apertured member is in axial alignment with an intermediate said guide pin and the stud; means operative after movement of said guide pin through said apertured member to withdraw said reciprocating feed means away from said guide pin, a reciprocable pusher element adjacent said guide pin and positioned to push the apertured member from said guide pin and onto the stud upon movement of said pusher element toward the stud when said guide pin is in abutment therewith, and holding means for temporarily holding said apertured member on said stud during retraction of said pusher element from said member.

2. The invention of claim 1, wherein said feed means is reciprocable in a plane perpendicular to the axis of the stud, and wherein said holding means is connected to said reciprocating feed means for removal from holding engagement with the apertured member in a direction generally normal to the axis of the stud.

3. Apparatus for loading an apertured member onto a stud, comprising, a rectilinearly reciprocable housing having an axially yielding guide pin and an adjacent pusher element projecting therefrom in the direction of reciprocation of said housing and for reciprocation therewith, the pusher element having an outer end that normally terminates short of the outer end of said guide pin; means supporting the stud in axial alignment with and in the path of reciprocation of said guide pin; a reciprocable shuttle adapted to move the apertured member between a retracted position where the apertured member is engaged by the shuttle and a projected position where the apertured member is in axial alignment with and intermediate said guide pin and the stud; and means for reciprocating said housing to move said guide pin through the apertured member and into axial abutment with the stud when the apertured member is in axial alignment with and intermediate said guide pin and the stud, means operative after movement of said guide pin through said apertured member to retract said shuttle from said projected position, and mechanism to move said pusher element to push the apertured member from said guide pin onto the stud when the shuttle has been retracted from projected position.

4. The invention of claim 3, wherein the pusher element is a longitudinal extension of a sleeve telescoped over said guide pin.

5. The invention of claim 3, wherein the pusher element is axially yielding relative to the housing.

6. Apparatus for loading an apertured member onto a stud, comprising, means for supporting the stud in upstanding position; a guide pin that is adapted to penetrate the apertured member and that is aligned axially with the stud and reciprocable into axial abutment therewith; a pusher element adjacent said guide pin and reciprocable with and relative to the latter; and a reciprocable shuttle adapted to move the apertured member between a retracted position where the apertured member is engaged by the shuttle and a projected position where the apertured member is in axial alignment with and intermediate said guide pin and the stud, said shuttle including a forwardly facing shoulder on its top surface and spaced from the shuttle front, and a surface portion intermediate the shoulder and the shuttle front that is lower than the adjacent shuttle top surfaces, the shuttle being provided with a guide pin-and-stud-accommodating vertical slot that extends longitudinally through the shuttle front to the shuttle shoulder, and a horizontal longitudinal slot forwardly of and in vertical alignment with the intermediate surface portion to form a pair of complementary horizontal grooves in the opposed shuttle sides forming the vertical slot.

7. The invention of claim 6, wherein the stud supporting means is positioned to support the stud with the top of the stud at a level intermediate the levels of the top surface and the intermediate surface of the shuttle.

8. The invention of claim 6, wherein the pusher element is aligned with the vertical slot in the shuttle.

9. The invention of claim 6, wherein means are provided for sequentially moving said shuttle from a retracted position where the apertured member is engaged by the shuttle shoulder to a projected position where the apertured member is in axial alignment with and intermediate said guide pin and the stud, moving said guide pin through the apertured member into abutment with the stud, retracting said shuttle to a position where the intermediate surface portion thereof underlies the apertured member that is on the guide pin, moving said pusher element to push the apertured member onto the stud and against the intermediate surface portion of the shuttle, further retracting said shuttle to a position where the apertured member is within the complementary horizontal grooves in the shuttle front, retracting the pusher element from abutment with the apertured member and the guide pin from abutment with the stud, and retracting the shuttle to a position where the apertured member is free of the horizontal grooves in the shuttle front.

10. The invention of claim 6, wherein a checking circuit is provided that includes a switch mounted for movement relative to the pusher element, an actuated device, and a wiring circuit interconnecting the switch and the actuated device, and wherein the pusher element is aligned with the vertical slot in the shuttle and has means for actuating the switch when the pusher element is reciprocated relative thereto.

11. The invention of claim 6, wherein means are provided for feeding a supply of the apertured members to the shuttle shoulder when the shuttle is in retracted position.

12. Apparatus for loading apertured members onto a stud, comprising a supply means containing a plurality of said members, reciprocal feed means for feeding said members from said supply means to a loading station, means for supporting said stud at said station, a pusher element reciprocably movable toward and away from said stud for pushing one of said members at said loading station onto said stud, a stop for intercepting an apertured member after it has been pushed a predetermined distance onto said stud, said stop being so configured as to permit the passage of said pusher element thereby in the absence of one of said apertured members on said stud, and means responsive to the movement of said pusher element past said stop for indicating the absence of an apertured member on said stud.

13. The apparatus set forth in claim 12 wherein said stop is mounted on said feed means for reciprocation therewith.

References Cited in the file of this patent
UNITED STATES PATENTS

| | | |
|---|---|---|
| 867,834 | Neureuther | Oct. 8, 1907 |
| 2,837,812 | Erdman | June 10, 1958 |
| 2,878,556 | Heidergott | Mar. 24, 1959 |
| 2,906,011 | Focht | Sept. 29, 1959 |